United States Patent
Wilberg et al.

(10) Patent No.: US 9,823,679 B2
(45) Date of Patent: Nov. 21, 2017

(54) POWER DELIVERY SYSTEM WITH MITIGATION FOR RADIATION INDUCED SINGLE EVENT LATCH-UP IN MICROELECTRONIC DEVICES

(71) Applicant: Hamilton Sundstrand Corporation, Windsor Locks, CT (US)

(72) Inventors: David R. Wilberg, Caledonia, IL (US); Milorad Manojlovic, Loves Park, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 245 days.

(21) Appl. No.: 14/744,759

(22) Filed: Jun. 19, 2015

(65) Prior Publication Data

US 2015/0370274 A1    Dec. 24, 2015

Related U.S. Application Data

(60) Provisional application No. 62/014,925, filed on Jun. 20, 2014.

(51) Int. Cl.
| | |
|---|---|
| G05F 1/625 | (2006.01) |
| H02H 3/06 | (2006.01) |
| H02H 3/093 | (2006.01) |
| H02J 4/00 | (2006.01) |
| H02H 3/00 | (2006.01) |
| H02H 3/027 | (2006.01) |
| H02H 5/00 | (2006.01) |

(52) U.S. Cl.
CPC ............... *G05F 1/625* (2013.01); *H02H 3/06* (2013.01); *H02H 3/093* (2013.01); *H02J 4/00* (2013.01); *H02H 3/006* (2013.01); *H02H 3/027* (2013.01); *H02H 5/005* (2013.01); *Y10T 307/406* (2015.04)

(58) Field of Classification Search
CPC .......... G05F 1/625; H02H 3/06; H02H 3/093; H02H 3/006; H02H 3/027; H02H 5/005; H02J 4/00; Y10T 307/406
USPC ........................................................ 307/11–87
See application file for complete search history.

(56) References Cited

U.S. PATENT DOCUMENTS 5,672,918 A * 9/1997 Kimbrough ............ H02H 5/005
250/389
6,947,272 B2 * 9/2005 Daniels .............. H03K 17/0822
361/93.7

(Continued)

OTHER PUBLICATIONS

Maxim, 50mA to 600mA Programmable Current-Limit Switches, 18 pages.

(Continued)

*Primary Examiner* — Brandon S Cole
(74) *Attorney, Agent, or Firm* — Kinney & Lange, P.A.

(57) ABSTRACT

A power delivery system includes a programmable current limit switch circuit connected between a power supply and electronic control circuits that are susceptible to single event latch-up. The programmable current limit switch is connected in a power bus between the power supply and the electronic control circuits. The programmable current limit switch circuit removes power from the electronic control circuits when an over-current condition persists for a blank time period, and restores power to the electronic control circuits after a retry time period.

5 Claims, 1 Drawing Sheet

(56) References Cited

U.S. PATENT DOCUMENTS

| | | | | |
|---|---|---|---|---|
| 7,532,448 B2* | 5/2009 | So | ............... | H02H 9/025 |
| | | | | 361/93.3 |
| 8,547,146 B1* | 10/2013 | Kelly | ............... | H02H 5/005 |
| | | | | 327/143 |
| 2010/0052647 A1* | 3/2010 | Forghani-zadeh | ... | H03K 17/122 |
| | | | | 323/349 |

OTHER PUBLICATIONS

Phil Layton, Single Event Latchup Protection of Integrated Circuits, 11th AIAA/USU Conference on Small Satellites, 5 pages.

Texas Instruments, Precision Adjustable Current-Limited Power-Distribution Switches, 34 pages.

Semiconductor Components Industries, LLC, Fixed/Adjustable Current-Limiting Power-Distribution Switches, Apr. 2013, 23 pages.

3D Plus, Hi-Rel Latch-Up Current Limiter (LCL) High Input Voltage Range, 2A Output Current Radiation Hardened Design, Sep. 5, 2013, 13 pages.

Fairchild Semiconductor, FPF2700 / FPF2701 / FPF2702—Accu Power 0.4-2A Adjustable Over-Current Protection Load Switches, Dec. 2013, 19 pages.

European Search Report, EP Application No. 15172824.3-1806, dated Nov. 6, 2016, 5 pages.

* cited by examiner

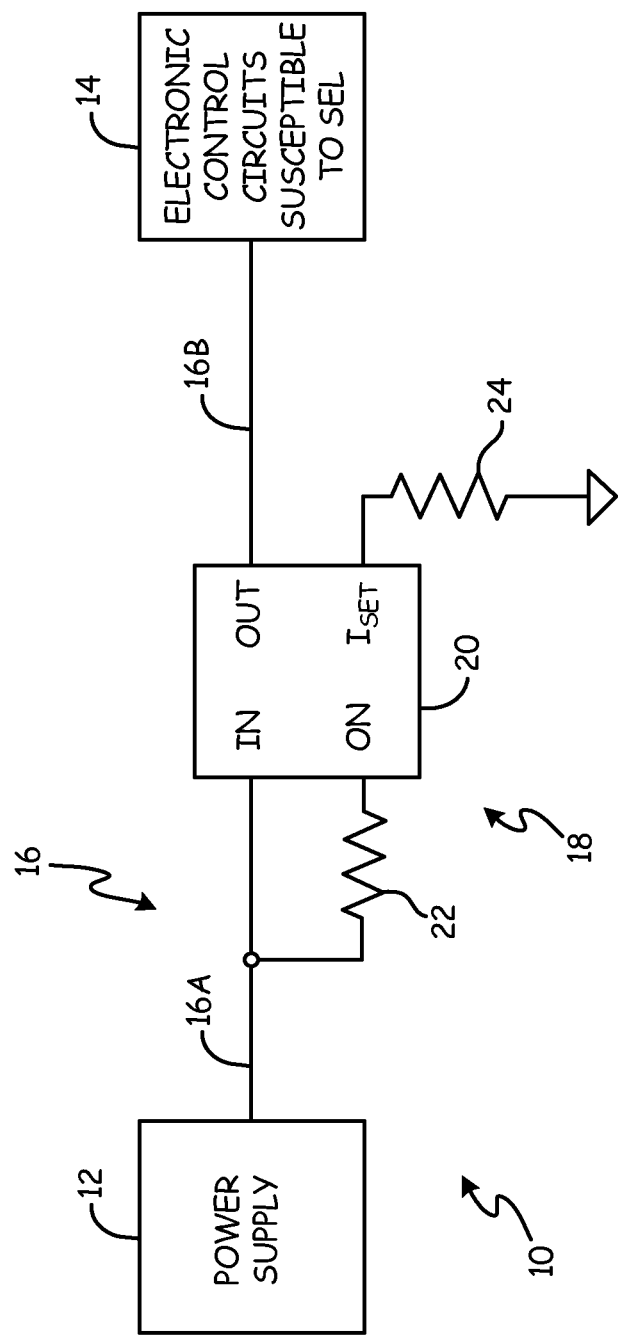

POWER DELIVERY SYSTEM WITH MITIGATION FOR RADIATION INDUCED SINGLE EVENT LATCH-UP IN MICROELECTRONIC DEVICES

CROSS-REFERENCE TO RELATED APPLICATION(S)

This application claims priority to U.S. Provisional Application No. 62/014,925, filed on Jun. 20, 2014, and entitled "POWER DELIVERY SYSTEM WITH MITIGATION FOR RADIATION INDUCED SINGLE EVENT LATCH-UP IN MICROELECTRONIC DEVICES," which is hereby incorporated by reference.

BACKGROUND

Electrical and electronic equipment for a newly developed airplanes incorporate control and status monitoring functionality that require large amount of data to be processed in a fraction of a second. In order to implement this functionality and to meet aircraft requirements such as size, weight power and cost, the electrical and electronic equipment are often required to employ Commercial-Off-The-Shelf (COTS) microelectronics devices that offer high data processing capability and low power consumption, but are not necessarily intended for aerospace applications. While operating at high altitude, the aircraft electrical and electronic equipment is subjected to atmospheric radiation composed of charged particles, neutrons and other that can cause Single Event Effects (SEE) resulting in malfunction of the affected microelectronics device.

Many Commercial-Off-The-Shelf (COTS) embedded controllers, microprocessors, ASICs, FPGAs and RAM devices are vulnerable to Single Event Latch-up (SEL) when exposed to high altitude atmospheric radiation. Device latch-up results in system malfunction and ultimately permanent device failure. As the use of COTS devices on commercial aircraft becomes more extensive, the probability of SEL events increases.

Electronic hardware designed for space and aerospace applications must be fault tolerant, and traditional designs have used radiation hardened devices which employ Silicon on Insulator techniques for radiation immunity. These devices are expensive and performance typically lags in comparison to COTS devices. In order to make COTS Electronic hardware fault tolerant to SEL, additional circuitry is required to prevent the permanent device failure and to provide means to clear the fault and restore normal operation of the affected device.

SUMMARY

A power delivery system includes a power supply, a power bus for supplying power from the power supply to the electronic control circuits, and a programmable current limit switch circuit connected in the power bus between the power supply and electronic control circuits that are susceptible to SEL. The programmable current limit switch removes power from the electronic control circuits in response to an over-current condition and then restores power to the electronic control circuits.

BRIEF DESCRIPTION OF THE DRAWINGS

FIG. 1 is an electrical schematic diagram of a power delivery system that includes a programmable current limit switch circuit to mitigate effects of Single Event Latch-up (SEL).

DETAILED DESCRIPTION

FIG. 1 shows power delivery system 10, which supplies electric power from power supply 12 to electronic control circuits 14 over power bus 16 (which includes power bus sections 16A and 16B). Control circuits 14 are semiconductor devices such as COTS microelectronics, that are susceptible to Single Event Latch-up (SEL). Circuits 14 can represent, for example, embedded control systems used in aircraft.

Programmable current limit switch circuit 18 is inserted in power bus 16 of power delivery system 10 between power supply 12 and control circuits 14 to mitigate the effects of Single Event Latch-up on embedded control systems. Circuit 18 includes auto-retry programmable current limit switch 20, pull-up resistor 22, and current threshold setting resistor 24. Circuit 18 uses auto-retry programmable current limit switch 20 to detect a supply over-current condition resulting from semiconductor device latch-up in control circuits 14. In the event of a radiation induced latch-up event, current limit switch 20 limits current to a safe level by opening power bus 16, thereby preventing damage to the affected device. Input power from power supply 12 is removed from the control circuits 14 when the over-current condition persists for a fixed period, a time herein referred to as "blank time". The blank time period provides adequate time to allow normal in-rush current to settle after charging decoupling capacitance during power on, so the circuit 18 is immune to normal current transient conditions. Power will be automatically restored to the system 10 after a fixed period of time herein referred to as "retry time". This retry time period allows the decoupled power bus 16 to discharge the bus decoupling capacitance and release the latch-up condition.

Current limit switch 20 is an integrated circuit such as a Maxim 4995A current limit switch. Other similar integrated circuit limit switches are available from other manufactures. Current limit switch 20 includes input terminal IN, output terminal OUT, on command terminal ON, and current threshold setting terminal $I_{SET}$. Power supply 12 is connected by power bus section 16A to input terminal IN, and control circuits are connected by power bus section 16B to output terminal OUT.

The over-current threshold of current limit switch 20 is set by resistor 24, which is connected between terminal $I_{SET}$ and ground. The current threshold is set above the maximum system average current demand, but below the latch-up current level. This assures robust operation with no nuisance trips of current limit switch 20.

Pull-up resistor 22 forces the current limit switch 20 to turn on automatically when input power is applied by pulling up the on command input ON to the active state. Pull-up resistor 22 is connected between power bus 16 and input ON, and limits current to command terminal ON.

There are a number of benefits provided by power delivery system 10 with programmable current limit switch circuit 18. First, current limit switch circuit 18 provides a fixed blank time delay to allow for in-rush currents present during power on. Second, power supply current is limited during an SEL event to minimize the power dissipated by the latched device and to protect the device from the potential permanent damage. Third, current limit switch circuit 18 provides a fixed retry delay to discharge decoupling capacitors and release the latch-up condition eliminating the need for shunting devices. Fourth, current limit switch circuit 18 is simple and requires few devices, thus introducing minimal impact to printed circuit board layout and system reliability. Fifth, current limit switch circuit 18 automatically restores power and normal system operation after clearing the latch-up condition.

Programmable current limit switch circuit 18 is intended for aerospace applications where COTS electronic hardware is exposed to atmospheric radiation levels sufficient to cause single event latch-up. The current limiting and interruption of power delivery protects vulnerable electronic devices from permanent damage due to SEL and restores normal operation when power is re-applied. Circuit 18 is simple—it requires few components which minimizes impact to printed circuit board layout and system reliability.

Discussion of Possible Embodiments

The following are non-exclusive descriptions of possible embodiments of the present invention.

A power delivery system includes a power supply, a power bus for supplying power from the power supply to electronic control circuits that are susceptible to SEL, and a programmable current limit switch circuit connected in the power bus between the power supply and the electronic control circuits. The programmable current limit switch removes power from the electronic control circuits in response to an over-current condition and then restores power to the electronic control circuits.

The system of the preceding paragraph can optionally include, additionally and/or alternatively, any one or more of the following features, configurations and/or additional components:

The programmable current limit switch circuit removes power from the electronic control circuits when the over-current condition persists for a blank time period.

The programmable current limit switch circuit automatically restores power to the electronic control circuits after a retry time period.

The programmable current limit switch circuit includes an auto-retry programmable current limit switch having an input terminal, an output terminal, an ON command terminal, and a current threshold setting terminal.

The power bus includes a first section connected between the power supply and the input terminal and a second section connected between the output terminal and the electronic control circuits.

The programmable current limit switch circuit includes a pull-up resistor connected between the first section of the power bus and the on command terminal.

The programmable current limit switch circuit includes a current threshold setting resistor connected to the current threshold setting terminal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power delivery system comprising:
   a power supply;
   a power bus for supplying power from the power supply to electronic control circuits susceptible to SEL; and
   a programmable current limit switch circuit connected in the power bus between the power supply and the electronic control circuits to remove power from the electronic control circuits in response to an over-current condition and then restore power to the electronic control circuits the programmable current limit switch circuit comprising:
      an auto-retry programmable current limit switch integrated circuit having an input terminal, an output terminal, an on command terminal, and a current threshold setting terminal;
      a current threshold setting resistor connected to the current threshold setting terminal such that only the current threshold setting resistor is connected to the current threshold setting terminal external to the auto-retry programmable current limit switch integrated circuit.

2. The power delivery system of claim 1, wherein the programmable current limit switch circuit removes power from the electronic control circuits when the over-current condition persists for a blank time period.

3. The power delivery system of claim 2, wherein the programmable current limit switch circuit automatically restores power to the electronic control circuits after a retry time period.

4. The power delivery system of claim 1, wherein the power bus includes a first section connected between the power supply and the input terminal and a second section connected between the output terminal and the electronic control circuits.

5. The power delivery system of claim 1, wherein the programmable current limit switch circuit further includes:
   a pull-up resistor connected between the first section of the power bus and the on command terminal.

\* \* \* \* \*